United States Patent
Boone et al.

(10) Patent No.: US 10,028,438 B2
(45) Date of Patent: Jul. 24, 2018

(54) PICKUP UNIT WITH A WINDROW CONDITIONING ROLL FOR AN AGRICULTURAL BALER

(71) Applicant: CNH Industrial America LLC, New Holland, PA (US)

(72) Inventors: Wouter Boone, Ruiselede (BE); Danny Claeys, Oedelem (BE)

(73) Assignee: CNH Industrial America LLC, New Holland, PA (US)

( * ) Notice: Subject to any disclaimer, the term of this patent is extended or adjusted under 35 U.S.C. 154(b) by 132 days.

(21) Appl. No.: 15/088,769

(22) Filed: Apr. 1, 2016

(65) Prior Publication Data

US 2016/0286726 A1   Oct. 6, 2016

(30) Foreign Application Priority Data

Apr. 3, 2015 (BE) .................................. 2015/5218

(51) Int. Cl.
| | |
|---|---|
| *A01D 89/00* | (2006.01) |
| *B65G 33/00* | (2006.01) |
| *B65G 53/48* | (2006.01) |
| *B65G 65/46* | (2006.01) |
| *A01F 15/08* | (2006.01) |

(52) U.S. Cl.
CPC ......... *A01D 89/002* (2013.01); *A01D 89/007* (2013.01); *A01F 15/0825* (2013.01); *B65G 33/00* (2013.01); *B65G 53/48* (2013.01); *B65G 65/46* (2013.01)

(58) Field of Classification Search
CPC ...... A01D 89/00–89/008; A01D 84/00; A01D 84/02; A01F 15/0825; A01F 15/0833

USPC .................. 198/669, 662, 676, 677; 414/526
See application file for complete search history.

(56) References Cited

U.S. PATENT DOCUMENTS

| | | | | |
|---|---|---|---|---|
| 2,509,826 | A * | 5/1950 | Krause ................. | A01D 61/008 198/669 |
| 3,244,271 | A * | 4/1966 | Wenning .............. | A01D 61/002 198/669 |
| 4,015,410 | A * | 4/1977 | Smith .................... | A01D 84/00 56/341 |
| 4,565,057 | A * | 1/1986 | Vissers ................ | A01D 89/007 56/14.4 |
| 7,419,048 | B2 * | 9/2008 | Weiand ................ | A01D 61/004 198/662 |
| 2012/0201573 | A1 * | 8/2012 | Watanabe .......... | G03G 15/0853 399/256 |

FOREIGN PATENT DOCUMENTS

| | | |
|---|---|---|
| DE | 3707788 A1 | 9/1988 |
| EP | 1252814 A1 | 10/2002 |
| FR | 2843681 A1 * | 2/2004 ........... A01D 89/004 |

* cited by examiner

*Primary Examiner* — Alicia Torres
*Assistant Examiner* — Adam J Behrens
(74) *Attorney, Agent, or Firm* — Peter K. Zacharias

(57) ABSTRACT

A pickup unit for an agricultural baler. The pickup unit includes a frame; a pickup roll carried by the frame; and a windrow conditioning roll carried by the frame and positioned in front of the pickup roll when in an operating position. The windrow conditioning roll includes a center core and a pair of counter-rotating flightings surrounding the center core. The counter-rotating flightings are connected together in a manner such that wrapping of crop material around the windrow conditioning roll is inhibited.

20 Claims, 4 Drawing Sheets

PICKUP UNIT WITH A WINDROW CONDITIONING ROLL FOR AN AGRICULTURAL BALER

CROSS REFERENCE TO RELATED APPLICATION

This application claims priority to Belgium Application BE2015/5218, filed Apr. 3, 2015, the contents of which are incorporated herein by reference.

FIELD OF THE INVENTION

The present invention relates to agricultural balers, and, more particularly, to pickup units for such balers.

BACKGROUND OF THE INVENTION

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a duct or pre-compression chamber. The packer unit forms a wad of crop within the pre-compression chamber, which is then transferred to a main bale chamber. (For purposes of discussion, the charge of crop material within the pre-compression chamber will be termed a "wad", and the charge of crop material after being compressed within the main bale chamber will be termed a "flake"). Typically such a packer unit includes packer tines or forks to move the crop material from the pickup unit into the pre-compression chamber. Instead of a packer unit it is also known to use a rotor cutter unit, which chops the crop material into smaller pieces.

A stuffer unit transfers the wad of crop material in charges from the pre-compression chamber to the main bale chamber. Typically such a stuffer unit includes stuffer forks which are used to move the wad of crop material from the pre-compression chamber to the main bale chamber, in sequence with the reciprocating action of a plunger within the main bale chamber.

In the main bale chamber, the plunger compresses the wad of crop material into flakes to form a bale and, at the same time, gradually advances the bale toward the outlet of the bale chamber. The plunger reciprocates, back and forth, toward and away from the discharge end of the baler. The plunger may include a number of rollers, which extend laterally outward from the sides of the plunger. The rollers on each side of the plunger are received within a respective plunger slot formed in the sidewalls of the bale chamber, with the plunger slots guiding the plunger during the reciprocating movements.

When enough flakes have been added and the bale reaches a full (or other predetermined) size, a number of knotters are actuated which wrap and tie twine, cord or the like around the bale while it is still in the main bale chamber. The twine is cut and the formed baled is ejected out the back of the baler as a new bale is formed.

When the baler is used with narrow windrows, the windrow may be offset relative to the center of the pickup unit, and the crop material can be picked up by one side of the pickup unit. The pickup unit transfers the crop material to the precompression chamber, and sometimes the crop material tends to fill one side of the precompression chamber more than the other side. As the crop material is transferred from the precompression chamber to the main bale chamber, this can in turn result in the formation of an uneven or lopsided bale.

It is known to utilize an auger in front of the pickup roll on the pickup unit to more uniformly spread the crop material prior to being picked up by the pickup roll. For example, referring to EP 0043156, an auger placed in front of the pickup roll is equipped with 2 counter-rotating flightings which spread the crop material laterally outward. Each flighting has a laterally inner end which is located near the center of the pickup roll. The 2 flightings join each other at their laterally inner ends, and create in effect a hook that snags the crop material as the auger rotates, which tends to wrap the auger with the crop material. This can occasionally require the baler to be shut down, and the operator disembarks from the operator cab to manually remove the wrapped crop material.

What is needed in the art is an agricultural baler with a pickup unit which better spreads the crop material to ensure the formation of a uniform bale, without wrapping of the crop material.

SUMMARY OF THE INVENTION

In accordance with an aspect of the present invention, there is provided an agricultural baler with a windrow conditioning roll positioned at a front end of a pickup unit. The windrow conditioning roll is configured to spread crop material across a width of a pickup roll without wrapping of the crop material around the windrow conditioning roll.

In accordance with another aspect of the present invention, there is provided a pickup unit for an agricultural baler. The pickup unit includes a frame; a pickup roll carried by the frame; and a windrow conditioning roll carried by the frame and positioned in front of the pickup roll when in an operating position. The windrow conditioning roll includes a center core and a pair of counter-rotating flightings surrounding the center core. The flightings are connected together in a manner such that wrapping of crop material around the windrow conditioning roll is inhibited.

Advantageously, the windrow conditioning roll spreads the crop material across the width of the pickup roll when harvesting narrow windrows. Also advantageously, lumps within a windrow are spread out. Further advantageously, the windrow conditioning roll provides an increased harvesting capacity in light, big volume windrows (e.g., barley straw, hay, etc). Still further advantageously, the flightings on the windrow conditioning roll join with each other in a manner that avoids wrapping of the crop material around the roll. Even further advantageously, the flightings on the windrow conditioning roll join with each other in a manner that defines a neutral area, whereby crop material is not substantially moved laterally outward from the neutral area.

BRIEF DESCRIPTION OF THE DRAWINGS

For the purpose of illustration, there are shown in the drawings certain embodiments of the present invention. In the drawings, like numerals indicate like elements throughout. It should be understood, however, that the invention is not limited to the precise arrangements, dimensions, and instruments shown. In the drawings.

DETAILED DESCRIPTION OF THE INVENTION

Figure 1:
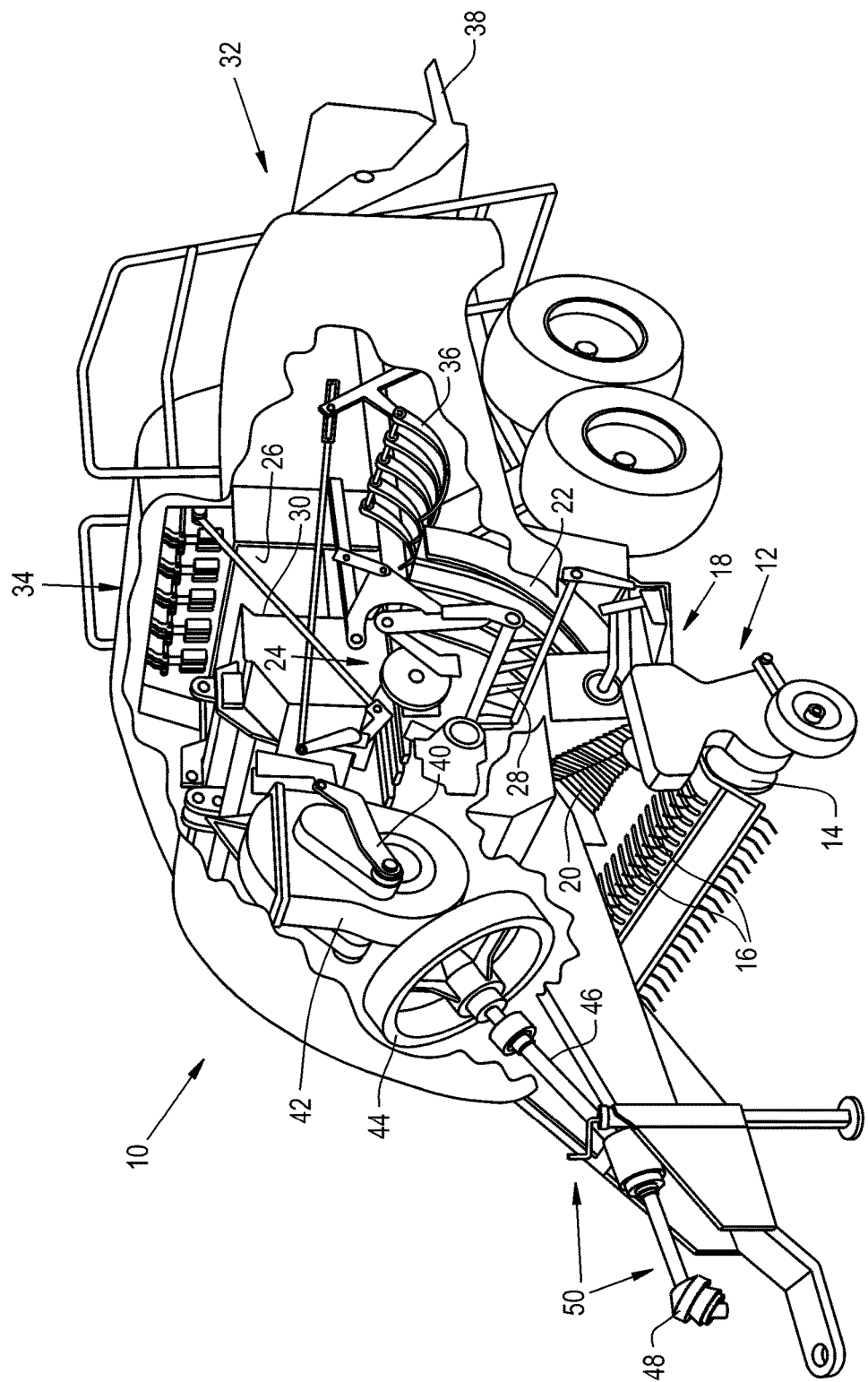
FIG. 1 is a perspective cutaway view showing internal workings of a large square baler, which can be configured with a pickup unit, in accordance with an exemplary embodiment of the present invention.

Referring now to the drawings, and more particularly to FIG. 1, there is shown a perspective cutaway view showing the internal workings of a large square baler 10, in accordance with an exemplary embodiment of the present invention. The baler 10 operates on a two stage feeding system. Crop material is lifted from windrows into the baler 10 using a pickup unit 12. The pickup unit 12 includes a rotating pickup roll 14 with tines 16 which move the crop rearward toward a packer unit 18. An optional pair of stub augers (one of which is shown, but not numbered) are positioned above the pickup roll 14 to move the crop material laterally inward. The packer unit 18 includes packer tines 20 which push the crop into a pre-compression chamber 22 to form a wad of crop material. The packer tines 20 intertwine the crop together and pack the crop within the pre-compression chamber 22. The pre-compression chamber 22 and the packer tines 20 function as the first stage for crop compression. Once the pressure in the pre-compression chamber 22 reaches a predetermined sensed value, a stuffer unit 24 moves the wad of crop from the pre-compression chamber 22 to a main bale chamber 26. The stuffer unit 24 includes stuffer forks 28 which thrust the wad of crop directly in front of a plunger 30, which reciprocates within the main bale chamber 26 and compresses the wad of crop into a flake. The stuffer forks 28 return to their original stationary state after the wad of material has been moved into the main bale chamber 26. The plunger 30 compresses the wads of crop into flakes to form a bale and, at the same time, gradually advances the bale toward an outlet 32 of the main bale chamber 26. The main bale chamber 26 and the plunger 30 function as the second stage for crop compression. When enough flakes have been added and the bale reaches a full (or other predetermined) size, knotters 34 are actuated which wrap and tie twine around the bale while it is still in the main bale chamber 26. Needles 36 bring the lower twine up to the knotters 34 and the tying process then takes place. The twine is cut and the formed bale is ejected from a discharge chute 38 as a new bale is formed.

The plunger 30 is connected via a crank arm 40 with a gear box 42. The gear box 42 is driven by a flywheel 44, which in turn is connected via a drive shaft 46 with the power take-off (PTO) coupler 48. The PTO coupler 48 is detachably connected with the PTO spline at the rear of the traction unit, such as a tractor (not shown). The PTO coupler 48, the drive shaft 46 and the flywheel 44 together define a portion of a driveline 50, which provides rotative power to the gearbox 42. The flywheel 44 has a sufficient mass to carry the plunger 30 through a compression stroke as power is applied to the drive shaft 46 by the traction unit (not shown).

Figure 2:
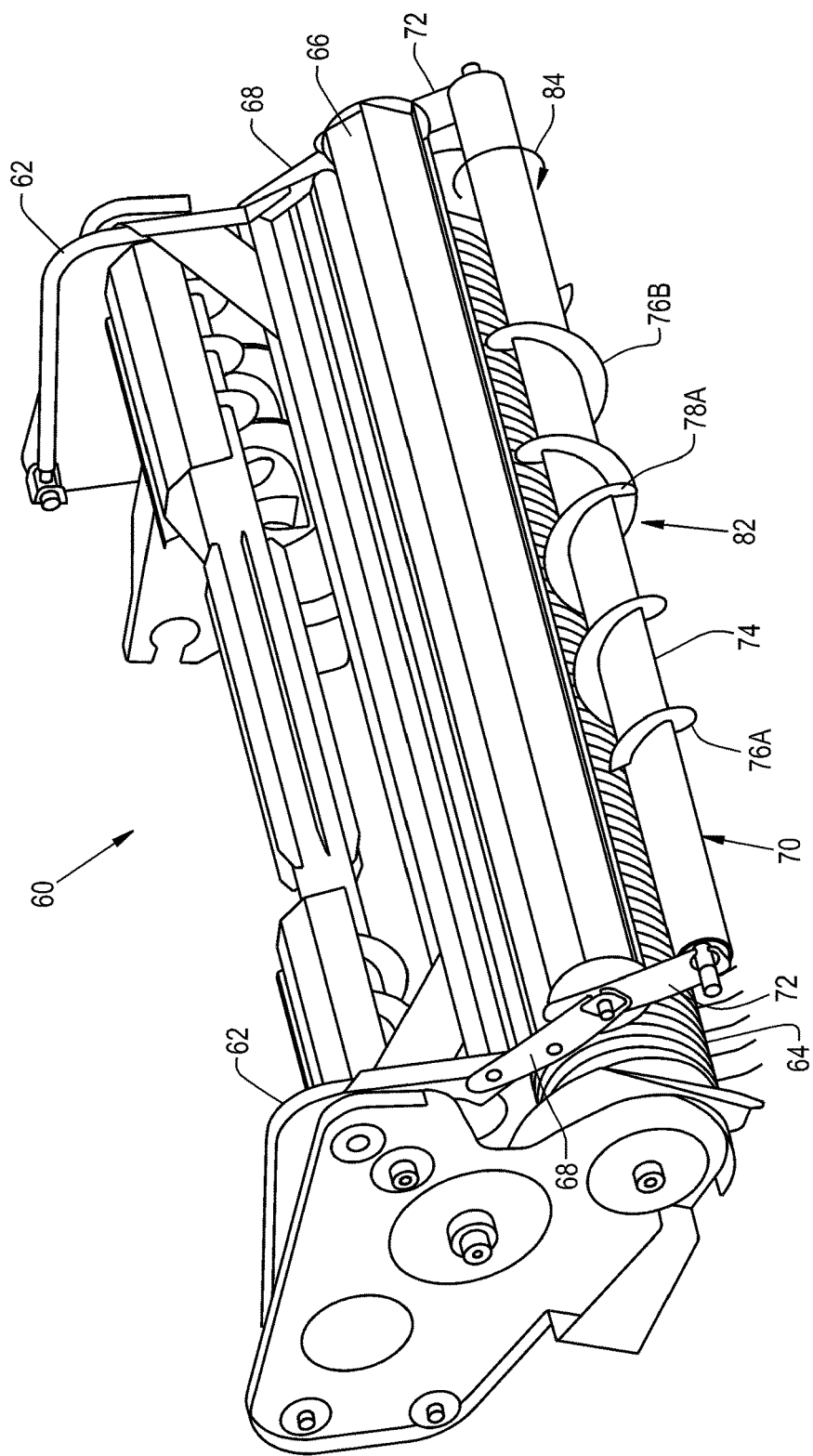
FIG. 2 is a perspective view of an embodiment of a pickup unit which can be used with the baler shown in FIG. 1, the pickup unit including an embodiment of a windrow conditioning roll, in accordance with an exemplary embodiment of the present invention.
Figure 3:
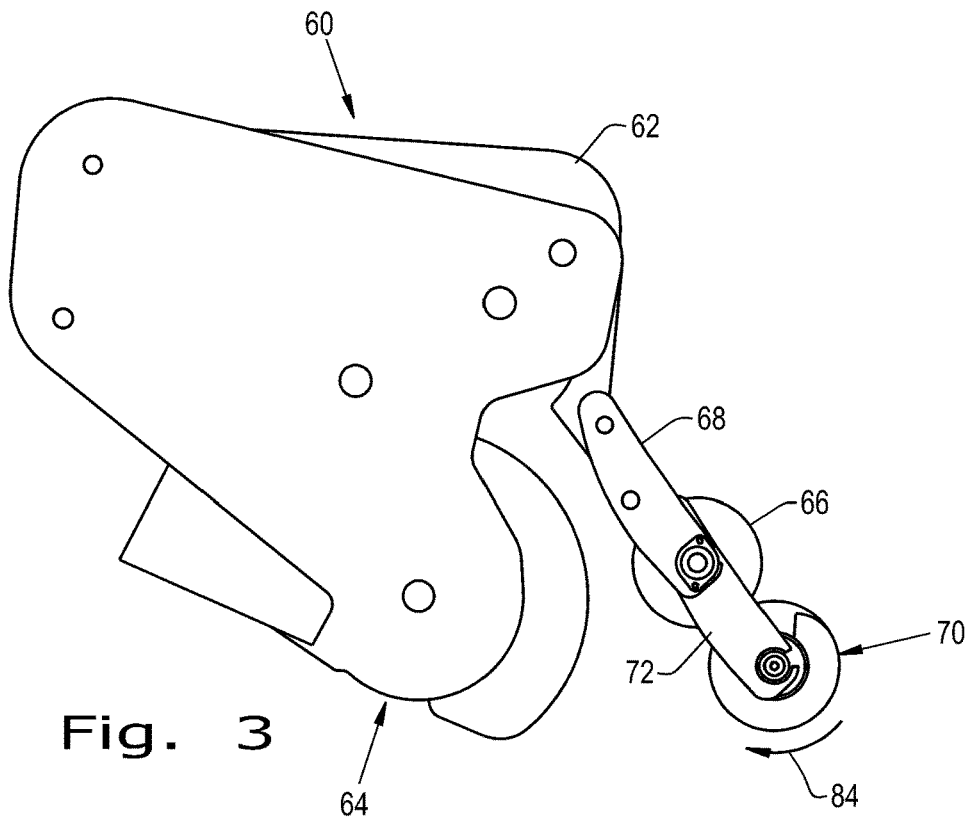
FIG. 3 is an end view of the pickup unit shown in FIG. 2, in accordance with an exemplary embodiment of the present invention.

Referring now to FIGS. 2 and 3, there is shown an exemplary embodiment of a pickup unit 60, in accordance with an exemplary embodiment of the present invention. The pickup unit 60 may be used on the baler 10 shown in FIG. 1 in place of the pickup unit 12. Similar to the pickup unit 12 shown in FIG. 1, the pickup unit 60 includes a frame 62 and a pickup roll 64, which is rotatably mounted to the frame 62. A windguard roll 66 is pivotally mounted to the frame 62, and may be positioned in front of the pickup roll 64. More specifically, a pair of pivot arms 68 each have an inboard end (not numbered) which is pivotally connected to the frame 62, and an outboard end (not numbered) which rotatably carries the windguard roll 66.

In an exemplary embodiment, a windrow conditioning roll 70 is also pivotally mounted to the frame 62, and may be positioned in front of the pickup roll 64 when in an operating position. In the illustrated embodiment, a pair of mounting plates 72 are mounted to the outboard ends of pivot arms 68, and the windrow conditioning roll 70 is rotatably mounted to and extends between the mounting plates 72. The mounting plates 72 are rigidly mounted to the pivot arms 68, but could also be pivotally movable relative to the pivot arms 68, and suitable actuators used to move the mounting plates 72 relative to the pivot arms 68. Alternatively, the windrow conditioning roll 70 could be directly mounted to the frame 62, rather than indirectly mounted by way of the pivot arms 68. The windrow conditioning roll 70 is a driven roll in the embodiment shown, and can be driven using any suitable configuration of mechanical components, such as a chain and sprocket, belt and pulley, hydraulic motor, electric motor, etc.

Figure 5:
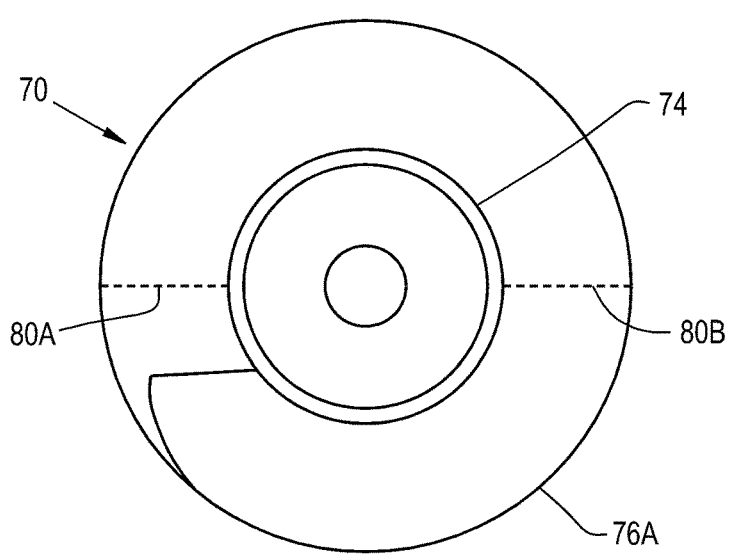
FIG. 5 is an end view of the windrow conditioning roll shown in FIGS. 2-4, in accordance with an exemplary embodiment of the present invention.
Figure 4:
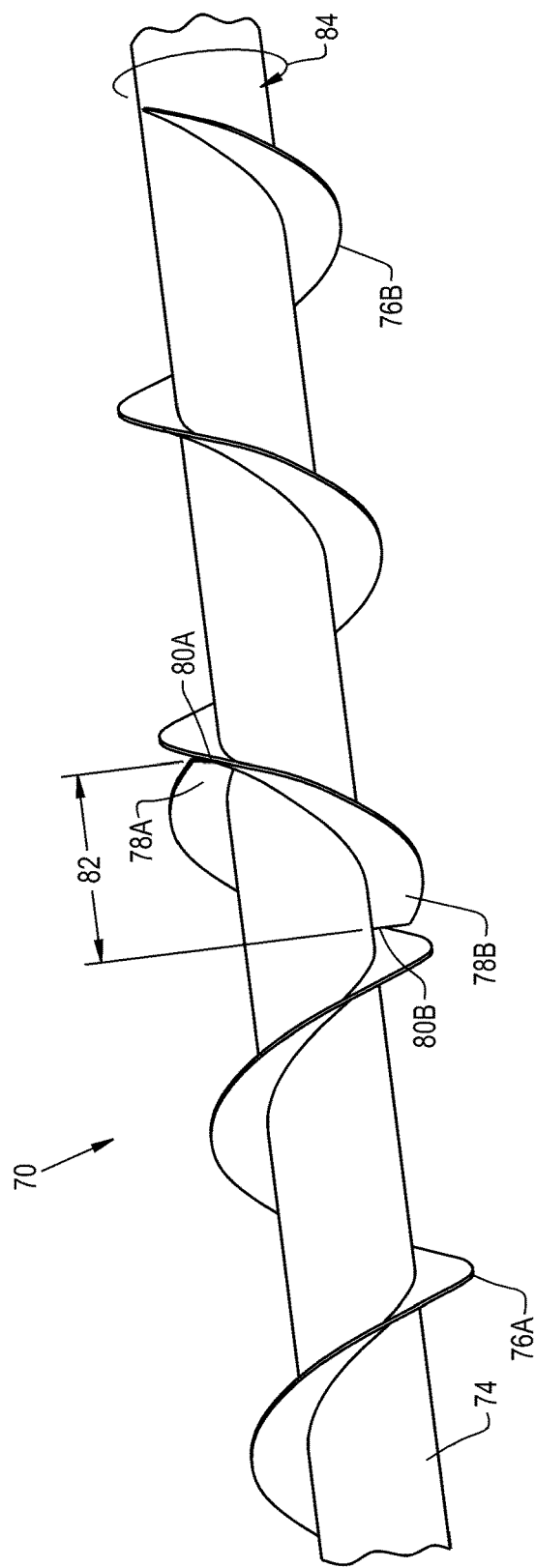
FIG. 4 is a perspective view of the windrow conditioning roll used on the pickup unit shown in FIGS. 2 and 3, in accordance with an exemplary embodiment of the present invention.

Referring now to FIGS. 4 and 5, conjunctively, there is illustrated the windrow conditioning roll 70, in accordance with an exemplary embodiment of the present invention. The windrow conditioning roll 70 includes a center core 74 and a pair of counter-rotating flightings 76A and 76B surrounding and attached to the center core 74. The flightings 76A and 76B are connected together with each other in a manner such that wrapping of crop material around the windrow conditioning roll 70 is inhibited. In contrast with conventional designs, the flightings 76A and 76B are connected together with each other with an absence of any hooked arrangement which would cause wrapping of the crop material around the windrow conditioning roll 70.

More specifically, each fighting 76A and 76B has a corresponding laterally inner end 78A and 78B. One laterally inner end 78A or 78B extends longitudinally past the other laterally inner end 78A or 78B, and vice versa, such that the pair of flightings 76A and 76B overlap with each other. The laterally inner end 78A is connected with the other respective fighting 76B, and conversely the laterally inner end 78B is connected with the other respective fighting 76A. In the illustrated embodiment, each laterally inner end 78A and 78B is connected with the other respective fighting 76A or 76B along an intersection line 80A and 80B, generally on opposite sides of the center core 74 (i.e., approximately 180° apart on opposite sides of the center core 74). The laterally inner ends 78A and 78B are each bonded with the other respective fighting 76A or 76B using a suitable connection, such as with a metallurgical bond (e.g., welding, brazing, etc.).

Each fighting 76A and 76B has a pitch defining a complete revolution of the fighting. Each fighting 76A and 76B overlaps with the other fighting a predetermined portion of a revolution. In the illustrated embodiment, each fighting 76A and 76B overlaps with the other fighting for approximately half of a revolution; thus, providing a combined overlap with each other of approximately a complete revolution.

Each fighting 76A and 76B overlaps with the other fighting in a neutral region 82. As apparent from studying FIGS. 2 and 4, rotation of the windrow conditioning roll 70 in a direction causing spreading of the windrow (as indicated by arrow 84) also results in the flightings 76A and 76B moving the crop material in opposite directions within the neutral region 82. That is, the portion of the flighting 76A within the neutral region 82 moves the crop material in one laterally outward direction, while the portion of the flighting 76B within the neutral region 82 moves the crop material in an opposite laterally outward direction. This results in a neutral region 82 where the crop can be spread out, but not conveyed substantially out of the neutral region 82. The neutral region 82 has a preselected width extending in a longitudinal direction of the windrow conditioning roll, depending on an extent of overlap of the flightings 76A and 87B. In the embodiment shown in FIGS. 2-5, the neutral region 82 has a preselected width of between approximately 100 to 500 mm.

It will be appreciated that by varying the pitch of the flightings 76A and 76B, the width of the neutral region 82 will likewise vary. Moreover, it may be possible (although unlikely) for the flightings 76A and 76B to have different pitches. Other design variations are also possible.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A pickup unit for an agricultural baler, the pickup unit comprising:
    a frame;
    a pickup roll carried by the frame; and
    a windrow conditioning roll carried by the frame and positioned in front of the pickup roll when in an operating position, the windrow conditioning roll comprising a center core and a pair of counter-rotating flightings surrounding the center core,
    wherein each of the counter-rotating flightings has a laterally inner end,
    wherein the laterally inner end of one of the counter-rotating flightings extends longitudinally past the laterally inner end of another of the counter-rotating flightings, such that the counter-rotating flightings overlap with each other; and
    wherein the laterally inner end of the one of the counter-rotating flightings is directly connected with the other of the counter-rotating flightings.

2. The pickup unit of claim 1, wherein the laterally inner end of the other of the counter-rotating flightings is directly connected with the one of the counter-rotating flightings.

3. The pickup unit of claim 1, wherein the laterally inner end of the one of the counter-rotating flightings is connected with the other of the counter-rotating flightings at a first connection, and the laterally inner end of the other of the counter-rotating flightings is connected with the one of the counter-rotating flightings at a second connection, wherein the first and second connections are on opposite sides of the center core.

4. The pickup unit of claim 1, wherein the laterally inner end of the one of the counter-rotating flightings is metallurgically bonded with the other of the counter-rotating flightings, and the laterally inner end of the other of the counter-rotating flightings is metallurgically bonded with the one of the counter-rotating flightings.

5. The pickup unit of claim 1, wherein each of the counter-rotating flightings has a pitch defining a complete revolution of the each counter-rotating flighting, and wherein the counter-rotating flightings overlap with each other a predetermined portion of a revolution.

6. The pickup unit of claim 5, wherein the counter-rotating flightings overlap with each other for approximately half of the revolution of each of the counter-rotating flightings.

7. The pickup unit of claim 6, wherein the counter-rotating flightings have a combined overlap with each other of approximately a complete revolution.

8. The pickup unit of claim 5, wherein the counter-rotating flightings overlap with each other in a neutral region in which the counter-rotating flightings move crop material in opposite directions.

9. The pickup unit of claim 8, wherein the neutral region has a width extending in a longitudinal direction of the windrow conditioning roll, the width depending on an extent of overlap of the counter-rotating flightings.

10. The pickup unit of claim 1, wherein the counter-rotating flightings are connected together with an absence of any hooked arrangement which would cause wrapping of crop material around the windrow conditioning roll.

11. A pickup unit for an agricultural baler, the pickup unit comprising:
    a frame;
    a pickup roll carried by the frame; and
    a windrow conditioning roll carried by the frame and positioned in front of the pickup roll when in an operating position, the windrow conditioning roll comprising a center core and first and second counter-rotating flightings surrounding the center core,
    wherein each of the first and second counter-rotating flightings has a laterally inner end,
    wherein the laterally inner end of the first counter-rotating flighting extends longitudinally past the laterally inner end of the second counter-rotating flighting, such that the first and second counter-rotating flightings overlap with each other; and
    wherein the laterally inner end of the first counter-rotating flighting is directly connected with the second counter-rotating flighting.

12. The pickup unit of claim 11, wherein the laterally inner end of the second counter-rotating flighting is directly connected with the first counter-rotating flighting.

13. The pickup unit of claim 11, wherein the laterally inner end of the first counter-rotating flighting is connected with the second counter-rotating flighting at a first connection, and the laterally inner end of the second counter-rotating flighting is connected with the first counter-rotating flighting at a second connection, wherein the first and second connections are on opposite sides of the center core.

14. The pickup unit of claim 11, wherein the laterally inner end of the first counter-rotating flighting is metallurgically bonded with the second counter-rotating flighting, and the laterally inner end of the second counter-rotating flighting is metallurgically bonded with the first counter-rotating flighting.

15. The pickup unit of claim 11, wherein each of the first and second counter-rotating flightings has a pitch defining a complete revolution of the each counter-rotating flighting, and wherein the first and second counter-rotating flightings overlap with each other a predetermined portion of a revolution.

16. The pickup unit of claim 15, wherein the first and second counter-rotating flightings overlap with each other for approximately half of the revolution of each of the first and second counter-rotating flightings.

17. The pickup unit of claim 16, wherein the first and second counter-rotating flightings have a combined overlap with each other of approximately a complete revolution.

18. The pickup unit of claim 15, wherein the first and second counter-rotating flightings overlap with each other in a neutral region in which the first and second counter-rotating flightings move crop material in opposite directions.

19. The pickup unit of claim 18, wherein the neutral region has a width extending in a longitudinal direction of the windrow conditioning roll, the width depending on an extent of overlap of the first and second counter-rotating flightings.

20. The pickup unit of claim 11, wherein the first and second counter-rotating flightings are connected together with an absence of any hooked arrangement which would cause wrapping of crop material around the windrow conditioning roll.

* * * * *